United States Patent [19]

Bieback

[11] Patent Number: 5,060,308
[45] Date of Patent: Oct. 22, 1991

[54] FIREFIGHTERS MASK COMMUNICATION SYSTEM

[76] Inventor: John S. Bieback, 83 Hopkins Rd., Ellington, Conn. 06029

[21] Appl. No.: 299,333

[22] Filed: Jan. 23, 1989

[51] Int. Cl.[5] ............... H04B 10/10; H04B 10/22
[52] U.S. Cl. ............... 359/154; 367/132; 381/188; 441/124; 359/142
[58] Field of Search ............ 367/132; 381/188; 441/104–105, 124; 455/41, 66, 40, 603, 602, 619, 617

[56] References Cited

U.S. PATENT DOCUMENTS

| | | | |
|---|---|---|---|
| 2,123,196 | 7/1938 | Millard | 367/132 |
| 2,950,360 | 8/1950 | Duncan | 367/132 |
| 3,069,511 | 12/1962 | Rehman | 367/132 |
| 3,267,414 | 8/1966 | Kritz | 367/132 |
| 3,415,245 | 12/1968 | Yamamoto | 367/132 |
| 3,451,639 | 6/1969 | Epstein | 367/32 |
| 3,657,543 | 4/1972 | Rose | 455/618 |
| 4,491,699 | 1/1985 | Walker | 455/89 |
| 4,641,377 | 2/1987 | Rush | 455/614 |
| 4,750,216 | 6/1988 | Boyce | 455/617 |

Primary Examiner—Joseph A. Orsino
Assistant Examiner—L. Van Beck
Attorney, Agent, or Firm—Lawrence Hager

[57] ABSTRACT

A communication system for attachment to a standard type of firefighter's face mask. Generally speaking, the communication system is mounted on opposite sides of the glass/plastic lens portion without affecting the integrity of the mask seal or the breathing air conduits. An infra-red signal representative of the wearer's voice is transmitted through the mask lens to speaker-electronics for reproducing the amplified voice of the wearer out side the mask unit.

9 Claims, 4 Drawing Sheets

FIREFIGHTERS MASK COMMUNICATION SYSTEM

FIELD OF THE INVENTION

The invention relates to a communication system and, more particularly, to a communication system for improving voice communication/transmission from a protective face mask such as is used by a firefighter.

BACKGROUND OF THE INVENTION

In recent years a great deal of interest has been shown in the provision of a means to enable unmuffled voice communication from a protective firefighters mask and the like.

Some illustrative examples are shown in the patents noted below.

U.S. Pat. No. 4,508,936 issued Apr. 2, 1985 to Robert Ingall, shows and describes a communication system that utilizes an amplifier/speaker unit (32) that is mounted on the firefighter's waist-belt and is connected to the face mask via a cable (30). The system appears to use an induction method of transmission which is relatively sumptuous of battery energy and can either cause interference with and/or receive interference from external transmission signals. Another problem with this device is the high possibility of getting the cable (30) caught on something like a nail or other projecting object resulting in possible loss of communication and/or dislodging the face mask of the wearer while in a hazardous air (fire) environment.

U.S. Pat. No. 3,180,333 issued Apr. 27, 1965 to R. D. Lewis appears to show and describe a gas mask device that uses a signal transmitting line (50) mounted to the belt of the wearer. The amplifier unit is molded into/for a specific mask and therefore has limited use, which increases its relative repair/replacement costs. The amplifier and microphone appear to be hard wired through the mask by an adaptor which therefore results in a breach of the mask wall. The breach may result in a loss of integrity of the mask. This device also has the inherent problems noted above with regard to the Ingall's patent.

Other prior art patents of interest include U.S. Pat. No. 3,314,424 issued Nov. 14, 1962 to M. Berman; U.S. Pat. No. 2,953,129 issued Sept. 20, 1960 to A. Bloom et al; U.S. Pat. No. 2,997,550 issued Aug. 22, 1961 to A. D. Traller; U.S. Pat. No. 3,540,442 issued Nov. 17, 1970 to Robert L. Holloway; and U.S. Pat. No. 2,950,360 issued Aug. 23, 1960 to R. K. Duncan.

These patents are mentioned as being representative of the prior art and other pertinent references may exist. None of the above cited patents are deemed to affect the patentability of the present claimed invention.

The present invention involves a novel combination of features and components combined in such a way as to afford a very efficient, cost effective, relatively more reliable, easier to use solution to the difficulties and problems encountered with the prior art.

The present invention resides in part on the use of infra-red signal coupling between the microphone and the speaker-amplifier, through the face plate of a standard mask. The mounting of the microphone unit on the inside of the mask and the speaker-amplifier on the outside of the mask without breaching the mask's seals, face plate or other constituent components. The obviating of any need for connecting cables. The ease and inter-changability of the microphone and the speaker-amplifier for quick and simple repair. The ease of replacing batteries. The relative ease of use obviating the need for connecting cables and mounting speakers to belts and the like.

SUMMARY OF THE INVENTION

A communication system for use in combination with a face mask such as utilized by firefighters, generally comprising:

a small housing dimensioned and countoured for being mounted to the interior surface of the face plate of the mask;

a microphone secured to said housing;

an infra-red transmitter means operatively coupled to said microphone for transmitting an infra-red communication signal through said mask face plate indicative/representative of the wearers speech into the microphone;

a power source secured within said housing and being operatively coupled to said microphone and said infra-red transmitter means;

an external housing dimensioned and contoured for being mounted to the exterior surface of the face plated of the mask;

an infra-red receiving means secured to said external housing for receiving said transmitted infra-red communication signal and generating an electrical signal representative of said communication signal;

speaker means mounted to said external housing being responsive to said electrical signal for producing a voice/audible speech signal representative of and generally simulating the wearers speech into the microphone.

OBJECTIVES OF THE INVENTION

It is the general object of the present invention to provide a new and improved communication system/device capable of being affixed to different types of face masks or gas masks of a self contained breathing apparatus.

Another object of the present invention is to provide a communications system that is relatively compact in size and is mounted directly on a mask face piece lens such as those used in firefights operations.

Another object of the present invention is to provide a communications system mounted on a mask face piece lens without interfering with the sealed air breathing system of the mask.

Another object of the present invention is to provide an improved communication device that can be readily affixed to many different standard type masks without special tools or skill and relatively inexpensively.

Another object of the present invention is to provide an infra-red communication system for a self contained breathing apparatus which is substantially and relatively unaffected by local electro-magnet disturbances or transmissions.

Another object of the present invention is to provide a communication system that obviates any need for external connecting cables that may become entangled or caught on projecting objects.

Another object of the present invention is to provide a communication system for a self contained breathing apparatus that does not require time consuming connections and belt mounting of constituent components thereby reducing time response to emergency situations.

Another object of the present invention is to provide a relatively small, compact and easy to use communication system for a mask as used by firefighters in interior firefighting operations and/or areas involving hazardous chemical spills.

Another object of the present invention is to provide an improved communication system for a mask which does not alter the mask integrity and is compact so as not to hinder their wearers vision or interfere with the air passages of the self contained breathing apparatus.

Another object of the present invention is to provide a communication unit with the outside amplifier/speaker assembly to have a piezoelectric element used as a speaker instead of the conventional cone type speaker. This would reduce the outside unit weight and thickness to an ultra-thin design; therefore, providing a truly compact version with a minimum protrusion form the mask.

Another object of the present invention is to provide a mask voice communications system that could be readily adapted to any new or existing manufacturers' mask used for firefighting. The unit can be affixed to the face mask lens by an adhesive bond or mechanically, by a clip fashioned to accommodate the various shaped (mask) lenses and removed or disconnected easily for repairs or simply removed for the discontinuation of its use without disfiguring or impairing the intended use of the mask.

Another object of the present invention is to provide a mask communication system with clear voice sounds and with a voice actuated electronic circuitry that eliminates other noise within the mask such as breathing air sounds and internal pressurized air noise that occurs when the air circulation system is on.

Another object of the present invention is to provide a mask communications system with a voice actuated switch (VOX) and/or a motion type switch to energize the battery power in both the inside and outside units. The purpose of this system is to eliminate the manual power switch which could be unintentionally left on and thus drain the batteries.

Another object of the present invention is to provide a mask communications unit that would be designed and constructed to meet the rigorous use normally found in a fire ground operation by withstanding high and low temperatures, humidity, impact, dust, immersion/leakage, corrosion tests, and be intrinsically safe.

Another object of the present invention is to provide a mask voice communications system that is comprised of a single unit located on the outside of the mask. This outside unit contains the audio amplifier, speaker, a piezoelectric element, and small button type rechargeable batteries. The piezoelectric element that is mounted on the outer surface of the mask picks up the voice vibrations within the mask and causes the element to generate an electrical signal that is fed into the audio amplifier. The purpose of this system is to eliminate the need for a second unit inside the mask.

Another object of the present invention is to provide a mask communications system that is comprised of two separate units, both units are mounted on the facepiece directly in-line and opposite of each other. The outside unit contains the audio amplifier, speaker, batteries and a resonating pick-up device. The inside unit is a passive device that contains no batteries. The voice vibrations in the mask generate a resonating frequency within the inside passive unit which causes the outside unit to respond to that frequency of vibration and then amplifying it. The purpose of this system is to eliminate the need for batteries in the inside unit.

BRIEF DESCRIPTION OF THE DRAWINGS

Other objects and advantages of the present invention will be evident from the following detailed description when read in conjuction with the accompanying drawings which illustrate the preferred embodiments. Similar reference numerals refer to similar parts throughout.

DESCRIPTION OF THE PREFERRED EMBODIMENT

In the past five years or so, firefighting techniques and equipment have changed dramatically. Aggressive interior firefighting was limited to the protective clothing and air breathing equipment available. The self-contained breathing apparatus (SCBA) was not available for each firefighter on the fire scene. They were heavy, cumbersome and it took valuable time to put on.

Recently, the National Fire Protection Association (NEPA) along with the International Firefighters Association (IFFA) has upgraded and set specifications for manufacturers, both in firefighter's protective clothing and equipment, to withstand higher temperatures and to provide maximum safety. Specifically the SCBA has become lighter in weight, smaller in size with improved visibility, and an increased air capacity to allow a firefighter to operate longer and safer in an interior firefighting environment.

The increase use of synthetic materials such as plastics (i.e. foam cushions, synthetic rugs, and PVC articles) which are now used extensively in the make-up of furniture and other components within a building, has become an extreme hazard during fire. They generate intense heat with rapid fire spread and most of all their combustion by-products give off dense smoke that contains lethal gases such as hydrogen cyanide, sulfer dioxide, and carbon monoxide. This is a major difference as compared to wood and cotton by-products used ten to fifteen years ago. Inhalation of these gases has cost cities and towns thousands of dollars in compensation, liability payments, and death benefits.

Additionally responsibilities that fire departments have recently been required to handle are hazardous material accidents. These are spills or an accidental discharge of hazardous materials such as hydrogen chloride, lethal insecticides, cryogenic material and corrosive gases. Again, use of the SCBA is the primary protection for the firefighter during the containment and control of these incidents.

Due to the increase in hazards that the firefighter is being exposed to, many fire departments are requiring a mandatory mask policy. That is, each firefighter is now provided with a SCBA and is required to use it during all hazardous operations either in interior firefighting or exterior chemical spills.

The need for clear communications through the mask has now become more significant than ever. Due to the increase in use of the SCBA and for the safety of the firefighters in zero visibility environment, verbal communications is the only link to maintain contact with each other while conditions and unknown hazards are constantly changing.

Figure 1:
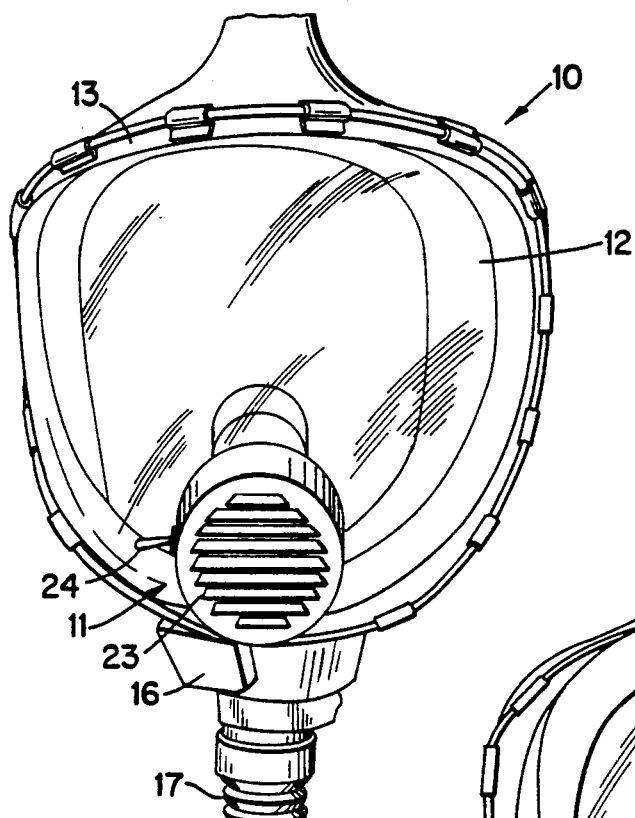
FIG. 1 is a perspective front view of a mask with the communication system affixed thereto in accordance with the invention.
Figure 2:
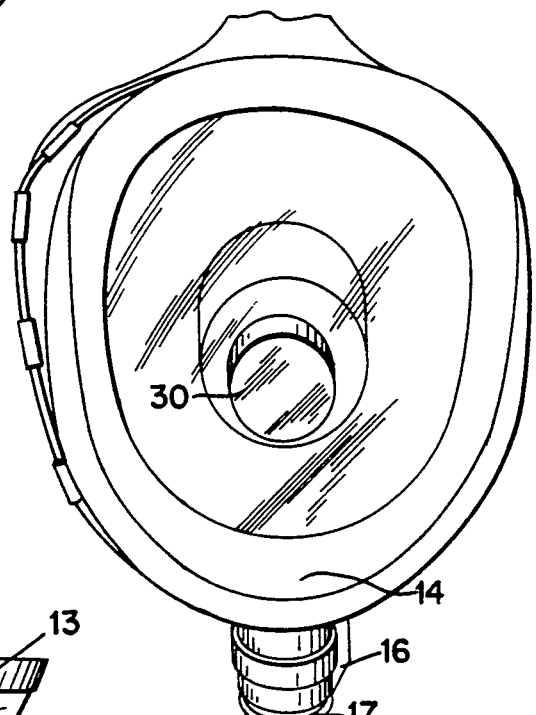
FIG. 2 is a perspective rear view of the mask and communication system showing in FIG. 1.
Figure 3:
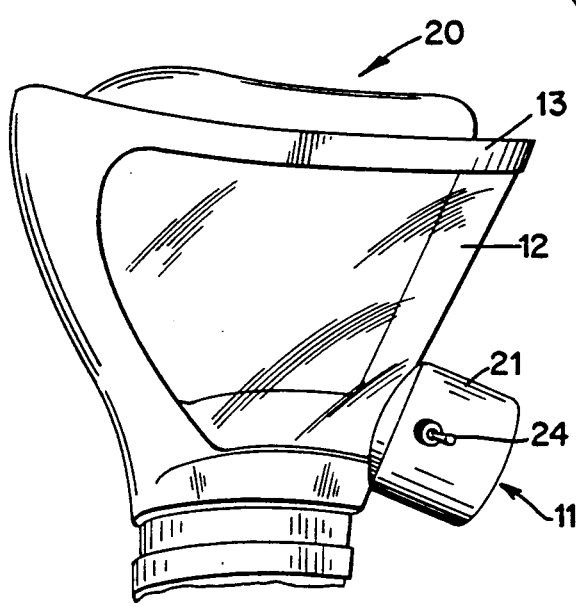
FIG. 3 is a perspective front view of an alternative type of mask with the communication system affixed thereto in order to illustrate the universality and flexibility of the system in accordance with the invention.
Figure 4B:
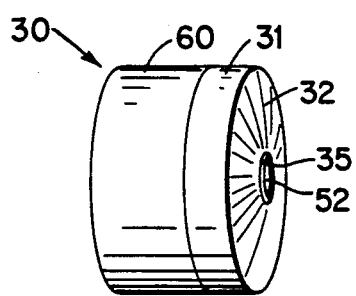
FIG. 4a and 4b are perspective side views of the Communication system.
Figure 4A:
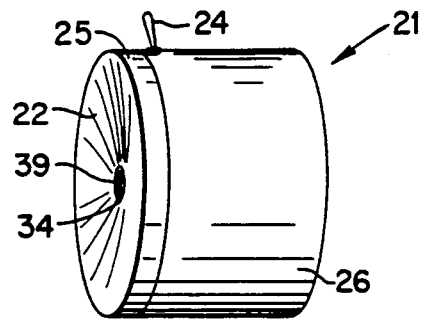
Figure 5B:
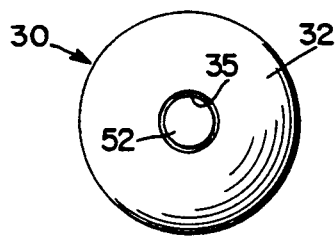
FIG. 5a and 5b are perspective rear views of both halves of the communication system.
Figure 5A:
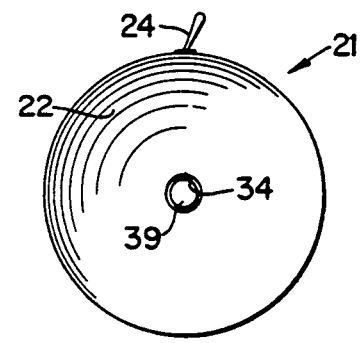

Referring now to the drawings in general and to FIG. 1 in particular, shown therein is a SCBA mask 10 with a communication system or device 11 mounted to the mask lens 12 in accordance with the present invention. The SCBA mask 10 is generally conventional and has a transparent face plate or lens 12 secured to a frame 13, one or more belts or straps for securing the SCBA mask 10 on the head of, for example, a fire fighter (not shown).

The face piece or frame 13 may be formed from a flexible impervious material such as rubber, plastic or other elastomeric material. The peripheral portions of the face piece or frame 13 are adapted to closely conform to the face or head of the wearer. A chin conforming portion 14 is generally provided. The chin portion 14 is dimensioned and contoured to enable the wearer to have substantial chin movement to permit the wearer to speak within the mask 10.

The gas or SCBA mask of the kind with which the present invention is adapted to be employed have their lower portions equipped with one or more outwardly projecting tubular extension means 16 which provide air passage means, for example, as an air or oxygen inlet and an air outlet, or both. Extension 16 provides a passageway for supplying air to the face of the wearer. The passageway is generally connected to a suitable air conduit or air hose 17, which, in turn, is connected to a source (not shown) of compressed air or oxygen. It will be understood that this invention is not limited to the particular type of tubular air conduit as illustrated herein. Since the SCBA mask may be of conventional design such as a "SCOTTORAMIC" Mask, exhaustive detail of such masks shall not be incorporated herein to avoid prolixity.

It should be understood at this time that an important and advantageous feature of the present invention is the ability to readily and inexpensively affix the communication system 11 to many different types of conventional (SCBA) masks, i.e., flexibility and universality.

In this manner, the cost of equipping, repairing and replacing the communication system 11 onto already owned/used masks is relatively inexpensive. It should be noted also that replacement of either the external speaker unit 21 or the internal microphone unit 30 may be affected separately.

Another distinguishing and advantageous feature of the present invention resides in the ability of the system 11 to be selectively positioned on the lens of the various masks 10 and 20, thereby accommodating not only the type of mask being utilized but also the individual wearer's proclivity for position on the lens 12, i.e., frontal or side disposition.

With particular attention now to FIGS. 4a, 4b, 5a and 5b, some of the external physical characteristics of communication system 11 will now be described.

The external speaker unit 21 generally has a tubular shape of relatively small diameter, for example, between one-half and two inches and a length between approximately 1 and ½ inches. The outwardly facing surface is perforated with holes or a grill like structure 23 to enable the speaker's sound to emanate therefrom. An on/off switch 24 is provided to enable or energize the amplifier-speaker unit 21. The end portion 25 has a concave shaped portion or surface 22 dimensioned and adapted for accommodating, i.e., being placed in juxtaposition with, the convex exterior surface of many standard lens 12 of a SCBA type mask. End portion 25 may be secured to the tubular section 26 of unit 21 by conventional means such as screw treads or one quarter turn bayonet type connectors. The concaved portion 22 may be formed of any suitable material such as, for example, rubber, plastic and the like. A relatively soft layer (not shown) may be provided to accommodate slight curvature variations of the different lens used by different mask manufacturers. This layer also absorbs possible shock from a bang of unit 21 with another object. The concaved end portion 22 is affixed, for example, by a glue or bonding agent, to the lens 12 at the location desired by the wearer. The tubular front section 26, which contains the speaker-amplifier and infra-red receiver electronics, may be readily removed and re-affixed to end portion 25. The constituent internal components of tubular unit 21 will be described in more detail hereinafter with reference to FIG. 6.

The internal microphone unit 30 generally has a tubular shape similar to speaker unit 21, with a diameter of approximately one and one-half inch and a length of approximately three-fourths of an inch. The inner surface portion 31 has a generally convex shape to be placed in juxtaposition with the curved inner surface of the SCBA mask. Convex surface portion 32 is generally longitudinally aligned with the concave portion 22, and may be secured to lens 12 by means of a glue or other suitable bonding agent. The other end of microphone unit 30 is equipped with a microphone/grill opening 47 to facilitate speech into the microphone unit 30.

The central area of microphone unit 30 and speaker unit 21 each have a hole or opening 35 and 34, respectively, to permit the transmission of the infra-red signals therebetween.

Figure 6:
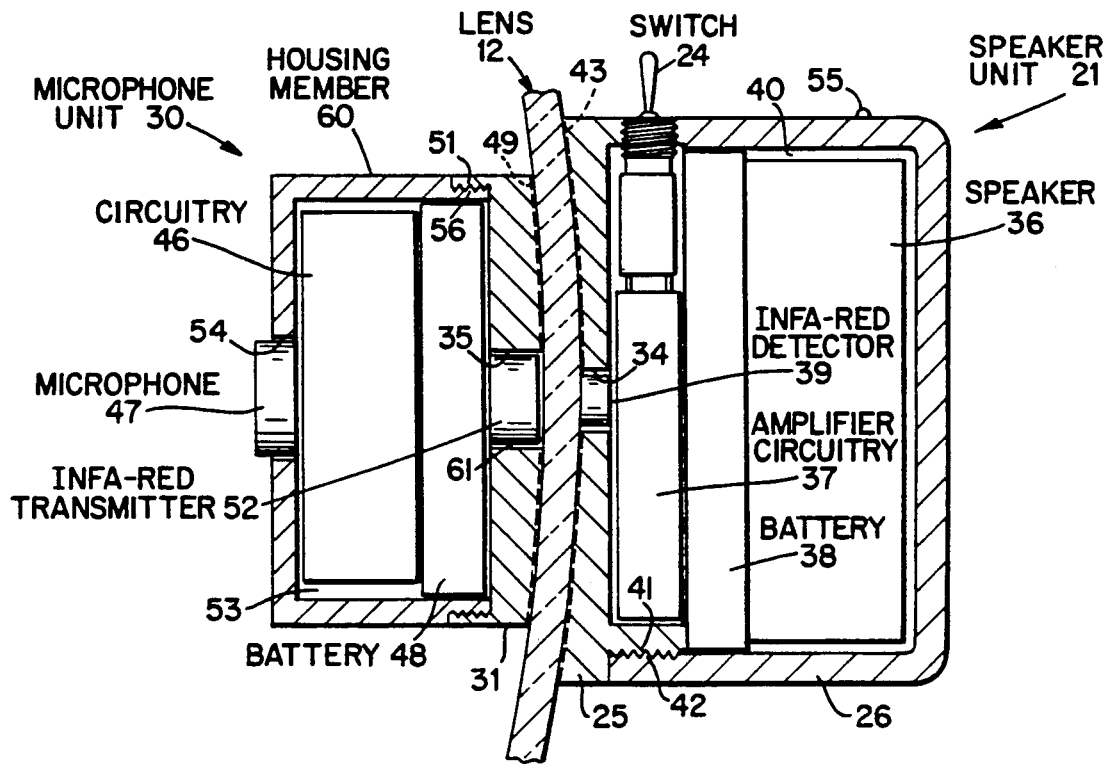
FIG. 6 is a sectional plan view of the communication system detailing the constituent components thereof.
Figure 7:
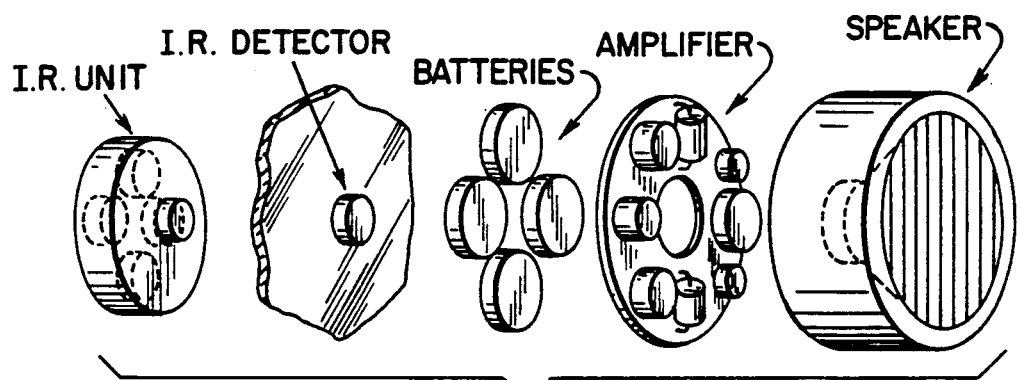
FIG. 7 is an exploded schematic/plan view of the infra-red type communication device in accordance with the invention.
Figure 8:
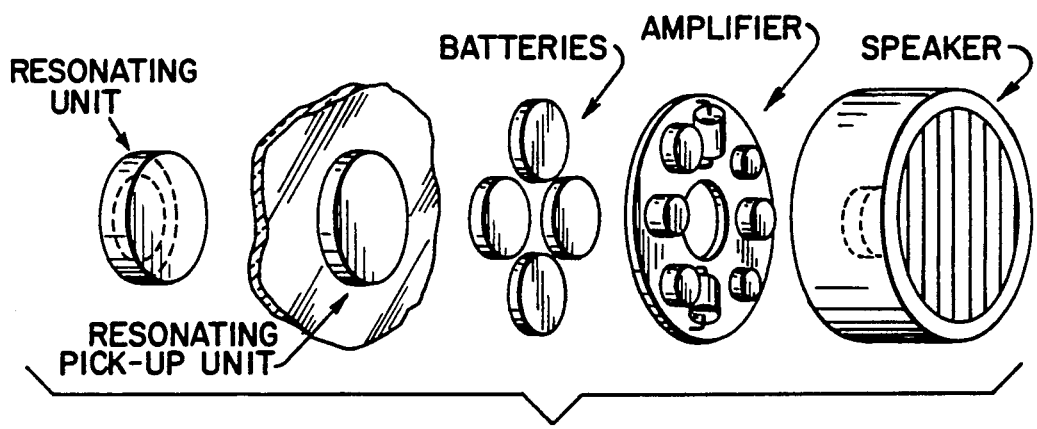
FIG. 8 is an exploded schematic/plan view of an alternative embodiment showing a resonating type communication device in accordance with the present invention.
Figure 9:
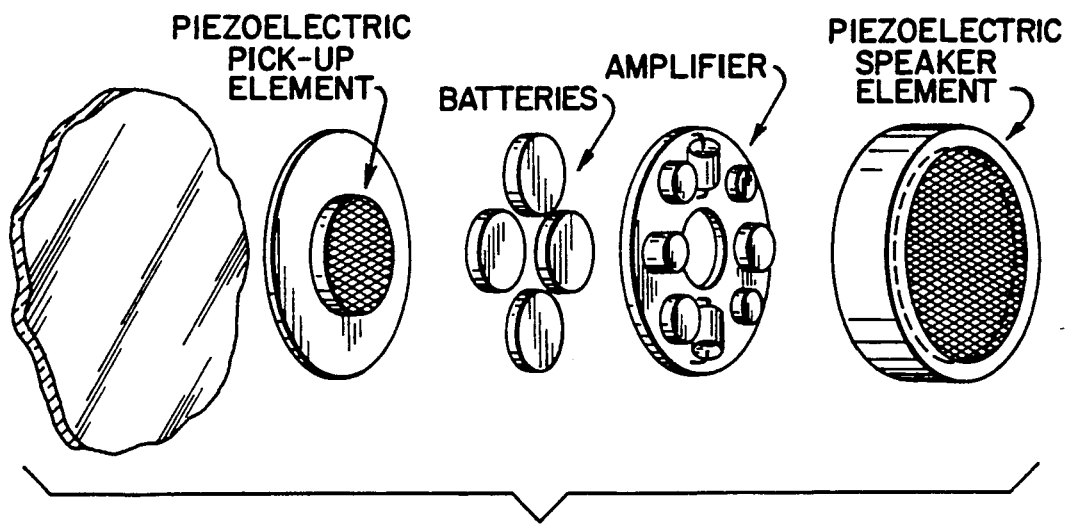
FIG. 9 is an exploded schematic/plan view of another embodiment showing a piezoelectric type communication device in accordance with the present invention.

With reference to FIG. 6, there can be seen a sectional plan view of the microphone unit 30 and speaker unit 21. The end unit 21 generally contains the speaker 36, amplifier circuitry 37, battery energy source 38, and infra-red detector means 39.

Section 21 contains an alcove 40 for receiving the infra-red detector elements 37 and 39. Infra-red detector 39 may be of conventional design and may be mounted within member 25 in alignment with center holes 34 and 35. Tubular Section 25 contains male treads 41 adapted for mating with the female treads 42 of tubular member 26. As noted above, the concave portion 22 is secured to the exterior of lens 12 by means of a bonding agent 43 such as epoxy or other conventional means that does not require breaching the seal integrity of lens 12.

Since infra-red detector 39, speaker 36, battery 38 and amplifier circuit 37 may be of conventional design that does not require invention, exhaustive details thereof shall not be provided herein to avoid prolixity.

The amplifier circuitry 37 is operatively coupled to the battery energy source 38 and detector 39 and speaker 38 by conventional means (not shown).

Speaker 36 may comprise a piezoelectric element or other small and light weight type of speaker suitable for the heat conditions that may be encountered by a firefighter. Likewise, the signal pick-up element may comprise a piezoelectric element or such an element in combination with an infra-red detector.

Microphone unit 30 includes convex member 31 and housing member 60, infra-red transmitter 46, microphone 47, battery source 48 and interconnecting circuitry (not shown).

As noted above, convex member 31 is adapted for being affixed, for example, bonded or epoxied 49, onto the inner surface of lens 12 with hole 35 aligned with hole 34 of speaker unit 21. A plurality of male threads 50 are provided to mate with female threads 51. Member 31 has an alcove area 61 for receiving infra-red transmitter 52.

Housing member 60 has a generally tubular or oval configuration with an alcove 53, male treads 50 and a rear opening 54. Microphone 47, battery energy source 48, associated (conventional) circuitry and infra-red transmitter element 52 are operatively coupled together in conventional manner. Since the microphone 47, battery energy source 48, infra-red transmitter 52 and associated circuitry may be of conventional design that does not require invention, exhaustive details thereof shall not be provided herein to avoid prolixity. Preferably, the microphone is of a noise canceling type to reduce noise from breathing.

It should be understood that the important features of the present invention resides in the novelty of the combination of components, the use of infra-red devices with a SCBA mask device, the construction arrangement to facilitate use, repair, replacement, installation, and changing of batteries, the elimination of connecting cables and the design features to enable affixing onto many different mask lens without obstructing vision or air passageways substantially.

Figure 10:
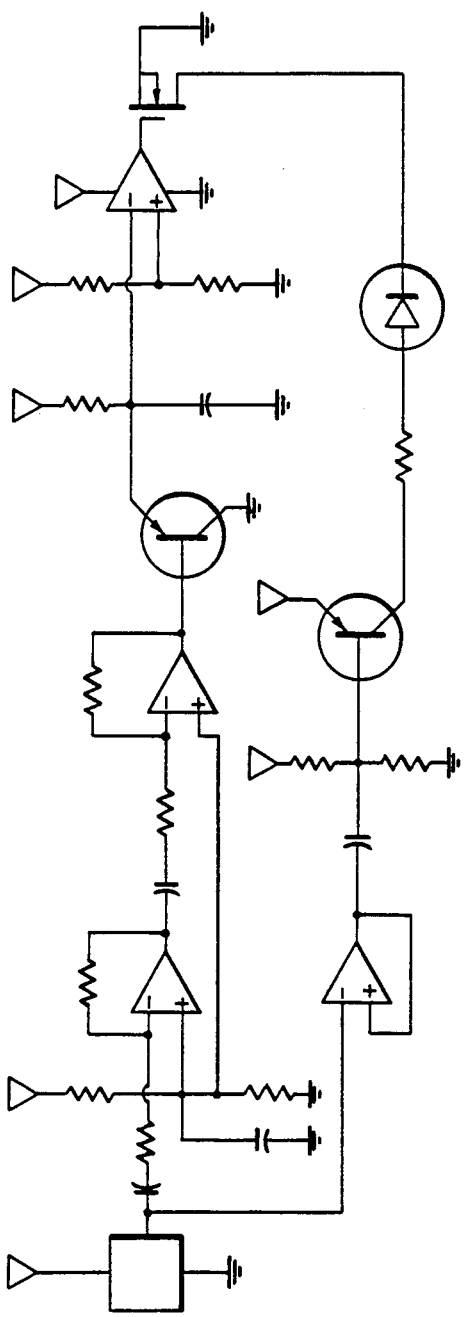
FIG. 10 shows the Transmitter Circuitry.
Figure 11:
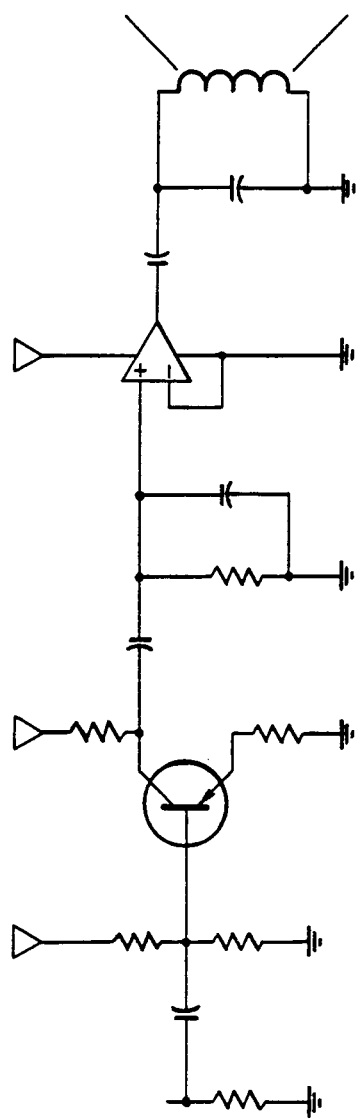
FIG. 11 shows the Receiver Circuitry.

Although conventional circuit design may be utilized, FIGS. 10 and 11 illustrate one circuit design prepared for applicant's invention.

While a certain specific embodiment has been set forth of the invention for the sake of illustration to persons skilled in the art, it is not intended to be limitative. Consequently, the invention should be construed broadly in accordance with its full spirit and scope.

What is claimed is:

1. A communication apparatus for being affixed to the lens of a conventional (SCBA) self contained breathing type face mask as utilized by fire fighters, comprising:
   inner housing means (30) dimensioned for being disposed on a selected portion of the lens, said inner housing means includes a first member (31) having a convex surface portion (32) contoured for being disposed in mating alignment with the lens and having wall portions defining a hole (35) and having connecting means (51), said convex surface portion being formed of suitable material to enable said first member to be bonded to the selected inner concave surface portion of the mask lens, and said inner housing means having a second member (60) having an alcove (53) and having connecting mean (50) for enabling said second member to be readily mounted onto and dismantled from said first member to enable quick easy access into said inner housing means;
   signal transmitter means (46) mounted within said inner housing means and being responsive to a voice communication for transmitting a signal indicative of the voice communication through the mask lens without degradation of the hermetic mask lens;
   outer housing means (21) dimensioned for being disposed on a selected portion of the exterior surface of the lens, said outer housing means includes a first member (25) having a concave surface portion (22) contoured for being disposed in mating alignment with the exterior surface of the lens and having wall portions defining a hole (34) and having connecting means (41), said concave surface portion being formed of suitable material to enable said first member (25) to be bonded to a selected outer convex surface portion of the mask lens, and having a second member (26) having an alcove (40), and having connecting means (42) for enabling said second member (26) to be readily mounted onto and dismantled from said first member (25) to enable relatively quick and easy access into said outer housing means;
   signal receiving means (39) mounted within said outer housing means and being responsive to the transmitted signal from said transmitting means for providing an electrical signal indicative of said transmitted signal;
   speaker means (36) mounted within said outer housing means and being responsive to said electrical signal for generating a representative voice communication without the mask.

2. A communication system as in claim 1, wherein:
   the microphone means includes noise cancelling circuitry.

3. A communication apparatus as in claim 1, in combination with a firefighter's type air breathing face mask, whereby voice communication through the mask being provided outside of the mask within a predetermined range of said speaker means.

4. A communication apparatus as in claim 1, wherein:
   the inner housing means has a tubular configuration with a diameter between one and two inches and a length between one-half inch and one and one-half inch; and
   the outer housing means has a tubular configuration with a diameter between one and two inches and a length between one and three inches.

5. A communication apparatus as in claim 1, wherein:
   the signal transmitting means includes an infra-red transmitter device; and
   the signal receiving means includes an infra-red receiving device.

6. A communication apparatus as in claim 1, wherein:
   the signal transmitting means includes a resonating transmitter device; and
   the signal receiving means includes a resonating receiver device.

7. A communication apparatus as in claim 1, wherein:

the signal transmitting means includes a piezoelectric transmitter device; and the signal receiving means includes a piezoelectric receiving device.

8. A communication apparatus as in claim 1, wherein:

the connecting means (41, 42) comprises mating male and female treads.

9. A communication apparatus as in claim 1, including:

an on-off switch means mounted on said outer housing means for activating and de-activating the signal receiving means and speaker means; and a low battery indicator means (55) mounted on said outer housing means for indicating low battery energy.

* * * * *